United States Patent [19]

Ashby et al.

[11] 4,304,620

[45] Dec. 8, 1981

[54] METHOD OF APPLYING DECORATIVE WINDINGS TO FISHING RODS

[75] Inventors: Howard A. Ashby, Newport Beach; Robert L. Barrie, Orange; Lester E. Wallis, Anaheim; Wayne L. Cummings, Tustin, all of Calif.

[73] Assignee: ABU Garcia, Inc., Fairfield, N.J.

[21] Appl. No.: 90,933

[22] Filed: Nov. 5, 1979

[51] Int. Cl.³ .............................................. B32B 31/12
[52] U.S. Cl. .................................... 156/172; D22/23; 43/18 R; 428/32
[58] Field of Search ................ D22/23, 1, 2; 428/377, 428/32; 156/172; 43/18 R, 23, 18 GF; 135/65; 273/81.5, 73 J, 81.4, 81.6, 75

[56] References Cited

U.S. PATENT DOCUMENTS

| D. 55,498 | 6/1920 | Woodbury | D22/1 |
| 288,305 | 11/1883 | Bush | 43/18 R X |
| 1,318,421 | 10/1919 | Welles | 43/18 R |
| 2,158,932 | 5/1939 | Ford | 43/18 R |

OTHER PUBLICATIONS

*Hi Tackle 1966*, Horrocks-Ibbotson Company Foldout Advertisement, *The Sporting Goods Dealer*, Jan. 1966, following p. 34.

Primary Examiner—Evan K. Lawrence
Attorney, Agent, or Firm—Fitzpatrick, Cella, Harper & Scinto

[57] ABSTRACT

Decorative windings are applied to a fishing rod shaft utilizing a combination of a painted area to which a decal and accent thread windings are applied.

8 Claims, 3 Drawing Figures

METHOD OF APPLYING DECORATIVE WINDINGS TO FISHING RODS

BACKGROUND OF THE INVENTION

The present invention pertains to a method of manufacture of fishing rods, and more particularly to a method of applying decorative windings to a rod shaft. Windings of the type to which this invention pertains are for decorative purposes and are placed along any part of a rod shaft which is free of hardware and are normally positioned just forward of the handle. The present invention is specifically concerned with intricate windings which, as will hereinafter become apparent, have heretofore been reserved for very expensive custom built rods.

In the past, intricate designs in decorative windings were produced by first tightly winding thread around the shaft to form a base for the decoration and then winding individual threads around the rod shaft over the base spiraling one thread in one direction and then spiraling the next in the opposite direction so that the threads intersect at precise intervals with the points of intersection forming a straight line parallel to the axis of the rod shaft. The process is repeated until a diamond, or like effect is achieved after which the windings are fixed and protected by application of clear epoxy or the like.

This process, while yielding a very acceptable product, suffers from numerous disadvantages from a commercial standpoint. More specifically, in order to produce a large or "full-size" diamond design with respect to the rod shaft diameter, with each diamond touching the next adjacent diamond, the exact position and angle must be determined, measured and laid out on the surface of the rod shaft prior to actual winding requiring a great deal of care and concentration. Each thread is then wrapped individually or in small groups side by side. After each wrap is made, the thread or groups of thread must be secured at both ends before proceeding with the next thread or group. Each of the foregoing steps is extremely time consuming and intricate and can usually be done only by the most skillful rod wrappers. This significantly increases the cost of the rod, thus prohibiting application of decorative windings to mass produced rods.

In addition to the cost factor, since the thread must be wound around the shaft, only spirals, cross-hatch or diamond designs have heretofore been possible. Large multi-colored cross-hatch or diamond designs are virtually impossible to produce uniformly, and to produce multi-colored designs, a thread for each color must be used which further complicates design and layout. Moreover, the known method is restricted to colors available for threads that can be used for fishing rods. Metallic or translucent threads are unavailable.

Thus, the only process presently available suffers from numerous problems and disadvantages and is completely inapplicable to rods for the average customer.

SUMMARY OF THE INVENTION

In accordance with the present invention, the problems and disadvantages associated with the prior art are avoided by utilizing a combination of paint applied to the rod shaft, a decal applied over the painted area and accent windings applied over the decal to produce the desired effect of a design which simulates a wound thread design.

More specifically, in accordance with the present invention, there is provided a method for applying decorative windings to a fishing rod shaft which comprises: applying a painted area along a portion of said rod shaft; applying a predetermined printed design comparable to a wound thread design over said painted area; applying at least one accent winding around said shaft over said printed design so that said design is visible between succesive turns of said winding; and thereafter, fixing said decorative winding to said rod shaft.

There has thus been broadly outlined the more important features of the invention in order that the detailed description thereof that follows may be better understood and in order that the present contribution to the art may be better appreciated. There are, of course, additional features of the invention that will be described hereinafter and which will form the subject of the claims appended hereto. Those skilled in the art will appreciate that this invention may be utilized as the basis for designing other applications for carrying out the purposes thereof. It is, therefore, important that the claims be regarded as including such equivalent embodiments as do not depart from the spirit and scope of the invention.

BRIEF DESCRIPTION OF THE DRAWINGS

One embodiment of the invention has been chosen for purposes of illustration and description, and is shown in the accompanying drawings, forming a part of the specification, wherein.

DETAILED DESCRIPTION OF THE INVENTION

Figure 1:
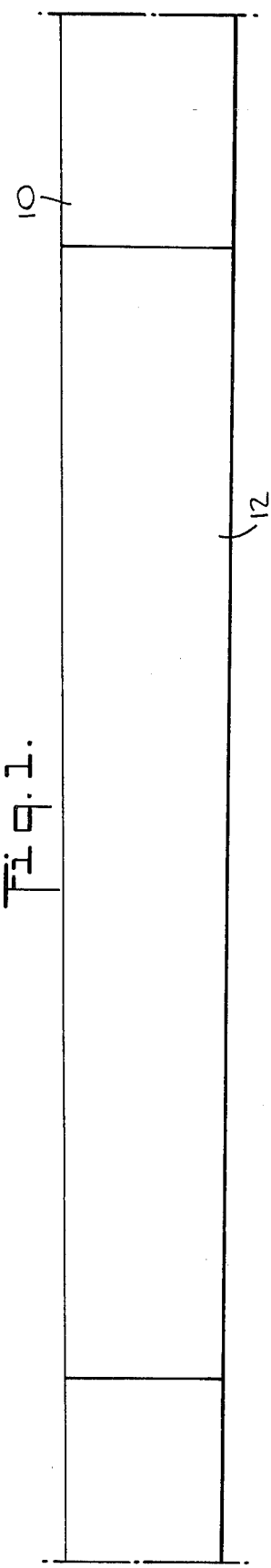
FIG. 1 is a plan view of a fishing rod shaft section illustrating the first step of the method of the invention.

With reference to FIG. 1, numeral 10 designates a section of a fishing rod blank designated for application of a decorative winding. The section illustrated is a portion of the rod to which no hardware, such as a ferrule, is to be attached; and for purposes of this description it may be assumed that the illustrated section of the rod blank is that area immediately forward of where the handle will be attached.

At the stage of production to which the FIG. 1 pertains, rod blank 10 has been pre-formed of fiber glass and epoxy material as is well-known in the art; and has had a finish such as an epoxy paint applied to its entire surface. Thereafter, to an area of, for example, about 6 inches along the rod shaft, there is applied a decorative paint 12 forming the base color of the decorative winding. Any type of paint may be used for this purpose so long as it adheres to the rod blank. Since the rod illustrated is of fiber glass and epoxy design, and the blank has previously been coated with an epoxy finish, it is preferable that the decorative paint 12 also be an epoxy base paint as this will bite into the finish of the rod blank and form a strong bond thereto. Of course, a lacquer or other type of paint could be used depending on the nature of the rod blank and the finish applied thereto. It is also preferred to use a paint 12 of a contrasing color to the finish of the rod blank as this enhances the decorative nature of the winding.

Figure 2:
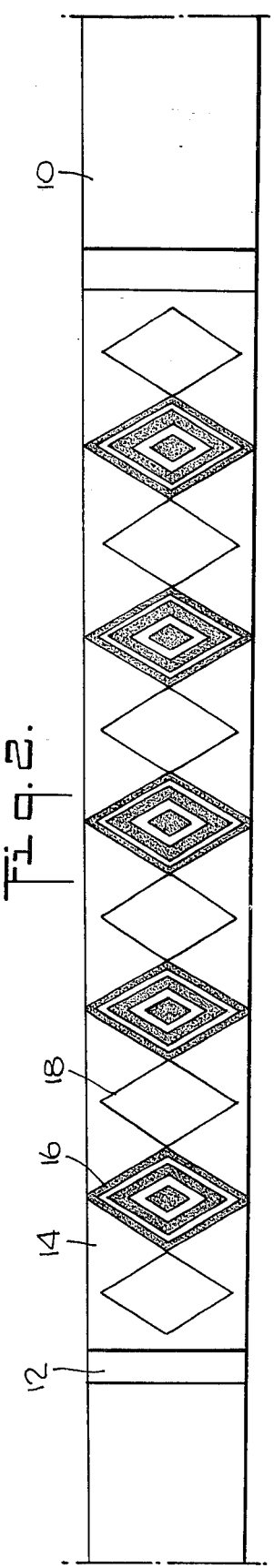
FIG. 2 is a plan view of a rod shaft section, illustrating the second step of the method of the present invention.

Thereafter, as is shown in FIG. 2, a decal 14 is applied to the circumference of the rod shaft 10 over the painted area 12. Preferably, decal 14 is a water soluble decal having a printed design thereon so as to transfer such design to the rod shaft with the base color 12 appearing through the transparent backing. Application of the design to the circumference of shaft 10 can alternatively be accomplished by use of a label or by printing directly on the rod shaft; and, as used herein, the term "decal" is intended to encompass these alternative methods. Those skilled in the art will quickly appreciate that by using decal 14, as shown in FIG. 2, any wound thread design configuration can be applied to the rod shaft including non-linear designs which have heretofore been unattainable. Moreover, decal 14 may have any number of colors in the design. As shown, the design comprises adjacent alternating diamonds 16 and 18 in which, for example, diamond 16 has a plurality of internal differently colored diamonds and diamond 18 is open. As the decal 14 is wrapped around the rod shaft 10, it will be appreciated that the design continues around the entire shaft so that as one rotates the rod shaft, a diamond 16 would have its apex adjacent the apex of a diamond 18.

Figure 3:
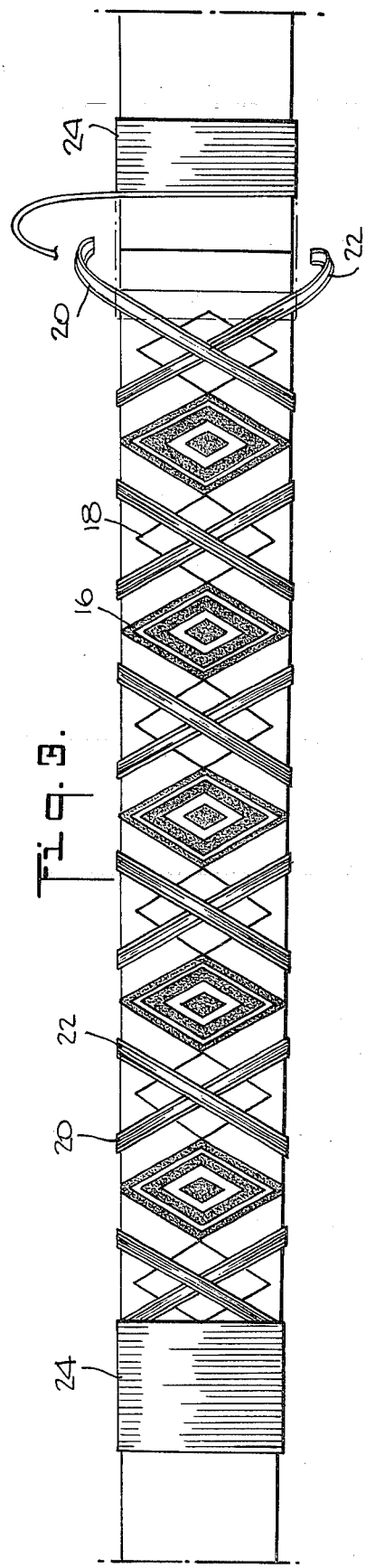
FIG. 3 is a plan view of a rod shaft section illustrating the third step of the method of the invention.

Following application of the decal to the rod shaft at least one decorative accent thread winding 20 is applied over the decal 14 in a spiraling fashion, for example as shown in FIG. 3. It will be appreciated that this step is a relatively simple procedure which can be accomplished by a less skilled worker or even by mechanical means. Then, a second thread winding 22 is applied in the same spiraling fashion but in the opposite direction to intersect at regular intervals with winding 20 at predetermined points in the design of decal 14. Most preferably, windings 20 and 22 comprise groups of threads which have been adhesively pre-bound together in the form of a ribbon or braid in various colors if so desired. The ends of windings 20 and 22 are secured at each end of the decorative area by winding threads 24 around the rod shaft in known fashion. Thereafter, a coating of clear epoxy is applied over the entire decorative winding thus fixing the decal and threads and protecting same against the elements.

As will be apparent to those skilled in the art, the foregoing method provides a means for application of decorative windings to a fishing rod shaft which yields a product comparable in design and appearance to the heretofore known method but accomplishes same with the need for highly skilled artisans and in a much shorter period of time thus permitting use of decorative windings on lower cost fishing rods which has heretofore been unavailable. Moreover, the present method permits the use of any color or combination of colors and shapes which was heretofore unattainable.

What is claimed is:

1. A method for simulating a wound thread design on a fishing rod shaft which comprises the steps of:
    applying a layer of paint to an area along a portion of said rod shaft;
    applying a predetermined printed design comparable to a wound thread design over said painted area, said printed design being such as to allow partial appearance of said painted area;
    applying at least one accent winding around said rod shaft over said printed design so that said design is visible between successive turns of said winding; and
    thereafter, fixing said winding to said shaft.

2. A method according to claim 1 wherein said printed design is a decal.

3. A method according to claim 1 wherein said printed design is a label.

4. A method according to claim 1 wherein said accent winding comprises a group of pre-bound threads in the form of a ribbon.

5. A method according to claim 1 wherein said accent winding comprises a group of pre-bound threads in the form of a braid.

6. A method according to claim 1 wherein said fixing step comprises application of a clear epoxy finish.

7. A method according to claim 1 wherein said printed design includes a plurality of diamond shapes and wherein said step of applying said accent winding is performed by applying said winding in crisscross fashion and aligning the open spaces between the winding crossings such that at least some of said diamond shapes are framed by said accent winding.

8. A method for simulating a wound thread design on a fishing rod shaft which comprises the steps of:
    applying a layer of paint to an area along a portion of said rod shaft;
    applying a predetermined printed design including a plurality of diamond shapes comparable to a wound thread design over said painted area, said printed design being such as to allow partial appearance of said painted area between at least some of said diamond shapes;
    applying at least one accent winding in crisscross fashion around said rod shaft over the parts of said painted area which appear between said diamond shapes such that at least some of said diamond shapes are framed by said accent winding; and
    thereafter, fixing said winding to said shaft.

* * * * *

UNITED STATES PATENT AND TRADEMARK OFFICE
CERTIFICATE OF CORRECTION

PATENT NO. : 4,304,620

DATED : December 8, 1981

INVENTOR(S) : Howard A. Ashby, et al.

It is certified that error appears in the above—identified patent and that said Letters Patent is hereby corrected as shown below:

Column 3, line 50, "same with" should be --same without--.

Signed and Sealed this

Thirteenth Day of April 1982

[SEAL]

Attest:

GERALD J. MOSSINGHOFF

Attesting Officer     Commissioner of Patents and Trademarks